United States Patent
Kobiela et al.

(10) Patent No.: US 9,940,919 B2
(45) Date of Patent: Apr. 10, 2018

(54) METHOD AND DEVICE FOR DAMPING OR AMPLIFYING A SOUND INTRODUCED INTO A PASSENGER COMPARTMENT OF A MOTOR VEHICLE

(71) Applicant: Robert Bosch GmbH, Stuttgart (DE)

(72) Inventors: Fanny Kobiela, Walheim (DE); Thomas Schniedertoens, Stuttgart (DE); Stefan Mittank, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 14/362,475

(22) PCT Filed: Oct. 11, 2012

(86) PCT No.: PCT/EP2012/070185
§ 371 (c)(1),
(2) Date: Jun. 3, 2014

(87) PCT Pub. No.: WO2013/083321
PCT Pub. Date: Jun. 13, 2013

(65) Prior Publication Data
US 2014/0294190 A1    Oct. 2, 2014

(30) Foreign Application Priority Data
Dec. 5, 2011 (DE) ......... 10 2011 087 765

(51) Int. Cl.
*H04R 1/10* (2006.01)
*G10K 11/178* (2006.01)
(Continued)

(52) U.S. Cl.
CPC ............ *G10K 11/178* (2013.01); *B60Q 5/008* (2013.01); *G10K 2210/1282* (2013.01);
(Continued)

(58) Field of Classification Search
CPC .......... B60Q 5/008; B60Q 9/00; B60Q 9/008; B60L 2270/42; B60L 3/0015;
(Continued)

(56) References Cited

U.S. PATENT DOCUMENTS 4,389,639 A * 6/1983 Torii ................. B60R 16/0373
340/460
5,410,606 A * 4/1995 Imai .................. G10K 11/1784
381/71.11
(Continued)

FOREIGN PATENT DOCUMENTS

AT    508606    2/2011
DE    19701801  7/1998
(Continued)

OTHER PUBLICATIONS

International Search Report for Application No. PCT/EP2012/070185 dated Apr. 25, 2013 (English Translation, 2 pages).

*Primary Examiner* — Paul S Kim
*Assistant Examiner* — Norman Yu
(74) *Attorney, Agent, or Firm* — Michael Best & Friedrich LLP

(57) ABSTRACT

The invention relates to a method (30) for damping and/or amplifying a sound introduced into a passenger compartment (10) of a motor vehicle, in particular an electrically driven motor vehicle, said sound being generated (32) by a sound source (22) arranged outside of the passenger compartment (10). A correction signal is generated (40) by means of correction signal means (16) which are paired with the sound source (22) and/or a sound-transmitting structure (20) of the motor vehicle, and the correction signal is determined (38) such that the sound is introduced into the passenger compartment (10) in a damped or amplified state.

17 Claims, 2 Drawing Sheets

(51) Int. Cl.
 *B60Q 5/00* (2006.01)
 *H04B 1/00* (2006.01)
(52) U.S. Cl.
 CPC .............. *G10K 2210/12822* (2013.01); *G10K 2210/3226* (2013.01); *G10K 2210/3229* (2013.01)
(58) Field of Classification Search
 CPC ...... G08G 1/166; G10K 11/178; G10K 15/02; G10K 2210/1282; H03G 3/20
 USPC .......................... 381/86, 302, 71.4; 340/463
 See application file for complete search history.

(56) References Cited

U.S. PATENT DOCUMENTS

| | | | |
|---|---|---|---|
| 2009/0046868 A1* | 2/2009 | Engle | G10K 11/1788 381/74 |
| 2010/0266135 A1 | 10/2010 | Theobald | |
| 2011/0175718 A1* | 7/2011 | Inoue | B60Q 5/008 340/463 |
| 2012/0288123 A1* | 11/2012 | Huang | H04R 3/00 381/123 |

FOREIGN PATENT DOCUMENTS

| | | |
|---|---|---|
| JP | 56128244 | 10/1981 |
| JP | 07322403 | 12/1995 |
| JP | 2008155791 | 7/2008 |
| JP | 2011148401 | 8/2011 |
| WO | 2011098879 | 8/2011 |

\* cited by examiner

METHOD AND DEVICE FOR DAMPING OR AMPLIFYING A SOUND INTRODUCED INTO A PASSENGER COMPARTMENT OF A MOTOR VEHICLE

BACKGROUND OF THE INVENTION

The present invention relates to a method for damping and/or amplifying a sound introduced into a passenger compartment of a motor vehicle, in particular an electrically driven motor vehicle, said sound being generated by a sound source arranged outside of the passenger compartment The present invention further relates to a device for damping and/or amplifying a sound introduced into a passenger compartment of a motor vehicle, in particular an electrically driven motor vehicle.

In the field of motor vehicle drive technology, it is generally known to use one or a plurality of electrical machines as the sole drive or together with a drive motor of another type (hybrid drive). Hybrid drives consist of a combination of an internal combustion engine and at least one electrical machine as well as the associated energy stores in the form of a fuel tank and a battery.

One characteristic of the purely electrically driven motor vehicles is that said vehicles generate a substantially quieter driving and operating noise than conventionally driven motor vehicles. They therefore generate only a very quiet engine noise. Intake, combustion or exhaust noises do not exist on account of the design principle. This also similarly applies to motor vehicles comprising a hybrid drive, in the event said vehicles (e.g. at low speeds) are operated in the purely electrical driving mode. On the one hand, said quiet driving and operating noises are very desirable in the sense of a reduced road traffic noise. The quality of life is thereby improved in large cities, in particular along the heavily traveled roads. On the other hand, vehicle noise does serve as a warning signal for an approaching vehicle. The exterior sound of electric vehicles is however so low at low speeds that the vehicles can no longer be noticed by, in particular, visually impaired people or in cases of reduced perception and could thus result in vehicle-person accidents.

Systems for installation in electric vehicles are currently being discussed throughout the world, which emit via a loudspeaker system an additional electronically generated sound at low speeds in order to warn road users in the proximity, such as, e.g., bicyclists or pedestrians, of the approaching vehicle. In order to actively generate an exterior sound, other systems are however also conceivable, such as the use of other oscillation generators or the targeted actuation of the electric machine or of ancillary units in the motor vehicle.

In order to ensure traffic safety, regulations or guidelines with regard to the active generation of exterior sound in the low speed range of electric vehicles are furthermore being developed, said regulations or guidelines being to ensure a perceptibility of said vehicles by pedestrians, bicyclists or other road users.

On the other hand, the quiet internal sound when driving in the electrical mode contributes substantially to the feeling of comfort of the driver. It is to be expected that this comfort aspect is seen as a particular advantage with respect to diesel/gas vehicles from the point of view of the vehicle manufacturer. This applies particularly to low speed ranges. At high speeds, rolling and wind noises can also be heard in the interior of the vehicle.

It is therefore desirable to simultaneously shield the vehicle interior with respect to measures taken to actively generate exterior sound in order to preserve the driving comfort.

SUMMARY OF THE INVENTION

The present invention therefore provides a method for damping and/or amplifying a sound introduced into a passenger compartment of a motor vehicle, in particular an electrically driven motor vehicle, said sound being generated by a sound source arranged outside of the passenger compartment. The inventive method states that a correction signal is generated by means of correction signal means which are paired with the sound source and/or a sound-transmitting structure of the motor vehicle and that the correction signal is determined such that the sound is introduced into the passenger compartment in a damped or amplified state.

The present invention furthermore provides a device for damping and/or amplifying a sound introduced into a passenger compartment of a motor vehicle, in particular an electrically driven motor vehicle, said device comprising correction signal means which are paired with the sound source and/or a sound-transmitting structure of the motor vehicle, wherein the correction signal means are designed to generate a correction signal such that the sound generated by the sound source is introduced into the passenger compartment in a damped or amplified state.

With the aid of the present invention, the driving comfort in the passenger compartment of an electrically driven motor vehicle is increased by a portion of the actively generated, artificial exterior sound, which is introduced into the passenger compartment, being damped or amplified. In so doing, the damping and/or amplifying of the sound introduced into the passenger compartment occurs directly at the sound source and/or the sound-transmitting structure of the motor vehicle. That structure is defined as a sound-transmitting structure which is substantially responsible for the transmission of the sound into the passenger compartment of the motor vehicle. This inventive arrangement of the correction signal means enables the sound transmission into the passenger compartment to be very efficiently influenced.

The present invention therefore enables the sound to be introduced into the passenger compartment in a damped or amplified state. The sound can thereby be damped, for example, in a normal driving operation of the motor vehicle. On the other hand, the sound is introduced into the passenger compartment in an amplified state if, for example, a hazardous situation arises.

In addition, further measures for passive acoustic damping (such as, e.g. damping materials) can be reduced on account of the inventive modification of the sound. Hence, the method according to the invention and the device according to the invention contribute to overall cost reduction.

It is particularly advantageous if the correction signal is determined on the basis of data from a central control unit which can be used for controlling the sound source.

On the basis of the data from the central control unit, the sound generated outside of the passenger compartment is sufficiently known in real time. The correction signal can therefore be synchronously outputted without the need for further measures. This applies particularly to known transmission paths of the artificially generated sound into the passenger compartment of the motor vehicle. A closed-loop control of the correction signal is therefore not necessary.

According to a further preferred embodiment, the correction signal is determined by means of sound detection means which detect a sound signal.

With the aid of the sound detection means, the portion of the sound is determined which is introduced into the passenger compartment. As a result, a precise determination of the correction signal and thus a precise influencing or modification of the sounds is made possible.

According to a further embodiment, the correction signal is determined in such a manner that the sound in the passenger compartment is substantially suppressed.

By means of this measure, a good acoustic separation of a vehicle interior sound from an artificial exterior sound of the electrically driven motor vehicle is achieved. Hence, people in the proximity of the vehicle can be warned of said approaching vehicle by an artificially generated exterior sound. At the same time, the complete driving comfort is maintained because the sound generated outside of the passenger compartment is substantially suppressed in the passenger compartment.

In a further embodiment, the correction signal is determined on the basis of a factor which produces the damping or amplification of the sound in the passenger compartment.

By means of this measure, the intensity of the sound dampening or amplification can be individually specified by the manufacturer of the motor vehicle or by the driver of the motor vehicle. In addition, it is also possible to automatically adjust the factor via a driver assistance system. For example, the driver assistance system can adjust an amplification of the sound in the event of the detection of a potentially hazardous situation, whereas the sound in the passenger compartment is substantially suppressed during normal operation.

According to a further embodiment, the correction signal is switched off in order to transmit the sound into the passenger compartment.

The deactivation of the correction signal can thereby occur manually by the driver or also automatically, e.g. by means of the driver assistance system. The correction signal can, for example, be switched off in order, by means of the active exterior sound, to additionally warn the driver of an impending collision with a pedestrian. A deactivation of said signal can also be used in other specific situations outside of potentially hazardous situations in order to transmit acoustic cues to the driver. This can, for example, relate to the vehicle start-up which is acoustically acknowledged to the driver by the correction signal being switched off.

According to a further embodiment of the device according to the invention, said device further comprises a control apparatus which is coupled to the correction signal means in order to generate the correction signal and which can be coupled to a central control unit that is connected to the sound source for the purpose of determining the correction signal.

By electrically coupling the control apparatus to the central control unit, data can be provided to the control apparatus which can be used to generate the exterior sound. This facilitates a very simple and temporally synchronous determination of the correction signal. In the case of known transmission paths of the sound into the passenger compartment of the motor vehicle, the correction signal can be outputted without complicated processing.

According to a further embodiment of the device, the correction signal means comprise an actuator for generating mechanical oscillations and/or a loudspeaker.

Through the use of an actuator, the transmission of the sound into the passenger compartment can be modified very efficiently and in a space saving manner directly at the sound source or at the sound-transmitting structure. In addition, loudspeakers can be disposed within or outside of the passenger compartment in order to generate the correction signal. If the loudspeakers are used in addition to the actuator, the transmission of the sound into the passenger compartment can thus be even more efficiently influenced.

It is particularly preferable if the device according to the invention further comprises sound detection means for determining the correction signal, said detection means being disposed in the passenger compartment or at the sound-transmitting structure and being set up to detect a sound signal caused by the sound.

With the aid of the sound detection means, a control circuit can be formed which precisely controls the transmission of the sound into the passenger compartment. The generated correction signal is determined in this case in combination with correction factors.

In a further alternative embodiment, the device comprises sound detection means and is furthermore coupled to the central control unit. The correction signal is thus determined on the basis of the data from the central control unit and on the basis of the sound signal that is detected by the sound detection means. As a result, the sound can be even more precisely modified.

In a further embodiment of the device, the sound detection means comprise a microphone and/or a structure-borne sound sensor.

As a result of this measure, the sound signal caused by the sound can be detected at different locations in the motor vehicle. The structure-borne sound sensor can thereby be disposed, for example, at the sound-transmitting structure of the motor vehicle. In addition, the microphone can be disposed in the passenger compartment of the motor vehicle. In so doing, a simple and effective closed-loop control of the correction signal is made possible.

According to a further embodiment, the device for switching off the correction signal further comprises a switching input.

Said switching input can either be manually controlled by the driver or automatically, for example via the driver assistance system. By means of the simple switching-on or off of the correction signal, an additional warning to the driver in the event of impending traffic accidents can be implemented. In addition, the driver can decide for himself/herself to what extent he/she would like to take notice of the sound generated outside of the passenger compartment.

In a further embodiment, the sound source is an oscillation generator, in particular a loudspeaker, an electrical machine and/or an ancillary unit of the vehicle.

According to the invention, the sound transmission of any sound sources into the passenger compartment can therefore be modified, i.e. sounds which are generated by a selective actuation of the electrical machine or an ancillary unit of the motor vehicle are also modified.

It goes without saying that the features, characteristics and advantages of the device according to the invention also correspondingly relate to or can be applied to the method according to the invention.

Moreover, the previously mentioned features and those to be subsequently explained cannot only be used in the respectively specified combination but also in other combinations or in isolation without departing from the scope of the invention.

DETAILED DESCRIPTION

Figure 1:
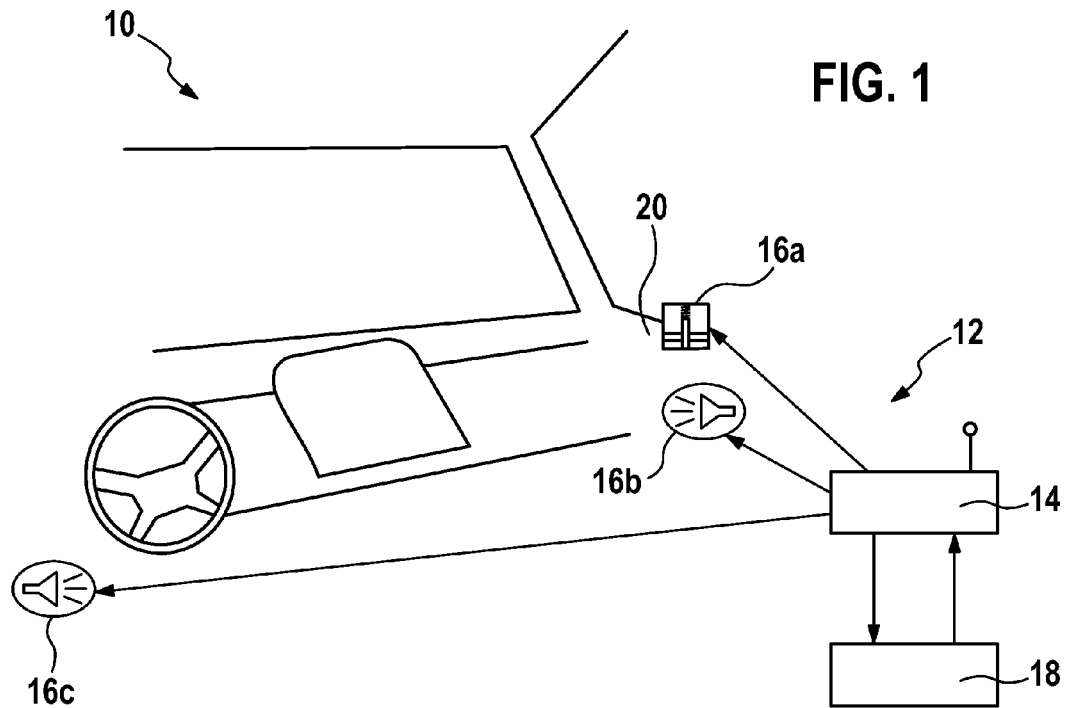
FIG. 1 shows in schematic form a passenger compartment of a motor vehicle and an embodiment of an inventive device comprising correction signal means.

FIG. 1 shows a passenger compartment 10 of a motor vehicle and an embodiment of a device 12 according to the invention in schematic form. In the present case, the motor vehicle is a purely electrically driven motor vehicle. The motor vehicle can alternatively be a vehicle with a hybrid drive or a conventionally driven vehicle. The device 12 comprises a control apparatus 14 which is electrically coupled to correction signal means 16, in the present case an actuator 16a and loudspeakers 16b, 16c.

Purely electrically driven vehicles are characterized by the fact that they generate a significantly quieter driving and operating sound than conventionally driven vehicles. As a result, a potential hazard however arises for other road users because said users do not notice the approaching electrically driven vehicle in a timely manner. For that reason, a sound is generated outside of the passenger compartment by the vehicle in order to warn pedestrians, bicyclists or other road users of the approaching vehicle. The sound is produced in the present case by an electrical machine of the motor vehicle, which machine is not depicted in detail in FIG. 1 and which is selectively actuated by the central control unit 18 for this purpose. The sound outputted outside of the passenger compartment 10 is however also introduced into the passenger compartment 10 and thereby reduces the driving comfort. According to the invention, a correction signal is therefore generated by the device 12, said signal damping or substantially suppressing the sound that is introduced into the passenger compartment 10. With regard to the transmission of the sound into the passenger compartment 10, it is to be determined whether the sound is introduced via a plurality of paths into the passenger compartment 10 (via air and/or structure-borne sound) or if a single vehicle structure is present which is substantially responsible for transmitting sound into the passenger compartment 10. In the present example, it is assumed that the sound is transmitted via a plurality of paths into the passenger compartment 10. For this reason, the loudspeakers 16b, 16c are disposed within the passenger compartment 10 and the actuator 16a at a sound-transmitting structure 20 in the proximity of said passenger compartment 10. Alternatively, the correction signal means 16 can also be disposed in the proximity of the electrical machine. The correction signal is determined by the control apparatus 14 on the basis of data which are provided by the central control unit 18. The data comprise, for example, items of information about the actuating procedure for generating the sound and about the vehicle state. In the present example, it is assumed that the transmission paths of the sound into the passenger compartment 10 are known. Due to the data provided by the central control unit 18 and the known transmission paths, the sound introduced into the passenger compartment 10 is sufficiently known in real time. The correction signal can therefore be outputted via the correction signal means 16 in a temporally synchronous manner and without further complex measures, i.e. a closed-loop control of the correction signal is not necessary. As a result, the generated sound can be directly suppressed at the emergence thereof.

In addition, the intensity of the damping of the sound can be varied. This results, for example, from a corresponding actuation of the control apparatus 14 by the central control unit 18. The control apparatus 14 can also alternatively be coupled to another component in order to set the degree of damping. In addition, the central control unit 18 can switch off the generation of the correction signal by means of a corresponding actuation of the control apparatus 14 in order to introduce the sound into the passenger compartment 10 and thereby warn the driver of a potentially hazardous situation. Alternatively, the central control unit 18 can actuate the control apparatus 14 such that the sound is introduced into the passenger compartment 10 in an amplified state. In so doing, the warning effect of a potentially hazardous situation can be further increased.

The driving comfort and simultaneously the safety of the vehicle passengers are thus increased by means of the device 12 according to the invention. In addition, the device 12 contributes to cost savings because measures for passive acoustic damping do not have to be taken.

Figure 2:
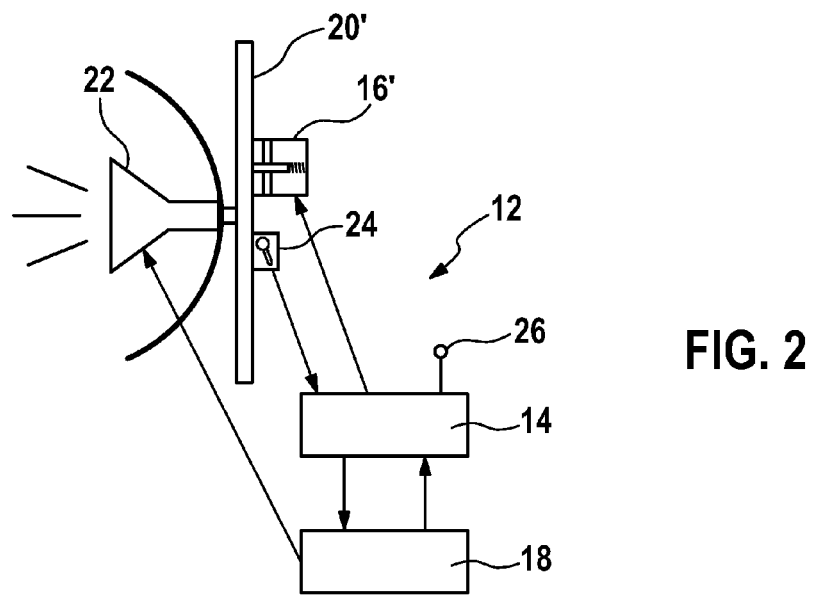
FIG. 2 shows in schematic form a sound source disposed outside of the passenger compartment and a further embodiment of the inventive device comprising correction signal means.

FIG. 2 shows a sound source 22 and a further embodiment of the inventive device 12 in a schematic depiction. In this embodiment, the sound source 22 is a loudspeaker 22 which is disposed outside of the passenger compartment 10 that is not depicted in FIG. 2. The device 12 comprises the control apparatus 14, correction signal means 16', in the present case an actuator 16', and sound detection means 24, in the present case a microphone 24. In an alternative embodiment, the sound detection means 24 can also comprise a structure-borne sound sensor. The control apparatus 14 is electrically coupled to the actuator 16' and the microphone 24. The control apparatus 14 furthermore comprises a switching input 26. In addition, the control apparatus 14 is electrically coupled to the central control unit 18.

In the present exemplary embodiment, the noise which warns the other road users of the approaching electrically driven vehicle is outputted from the loudspeaker 22. To this end, the loudspeaker 22 is actuated in a suitable manner by the central control unit 18. The sound can alternatively be generated by a selective actuation of ancillary units of the motor vehicle. In order to modify the sound introduced into the passenger compartment 10, the correction signal is determined by the control apparatus 14 and outputted via the correction signal means 16'. In order to determine the correction signal, data are used on the one hand which are provided by the central control unit 18 and which are used for generating the sound by means of the loudspeaker 22. On the other hand, the sound detection means 24 are used which detect a sound signal caused by the sound. To this end, the microphone 24 is disposed at a sound-transmitting structure 20' which is substantially responsible for the transmission of the sound into the passenger compartment 10. The correction signal is therefore determined on the basis of data from the central control unit 18 and on the basis of the detected sound signal while using correction factors. The correction signal is subsequently outputted using the actuator 16' in order to modify the sound introduced into the passenger compartment 10. To this end, the actuator 16' is likewise disposed at the sound-transmitting structure 20' in order to be able to influence the transmission of the sound into the passenger compartment 10 as efficiently as possible.

In this exemplary embodiment, a control circuit is formed by the sound detection means 24 and permits a very precise modification of the sound introduced into the passenger compartment 10.

The control apparatus 14 can furthermore transmit items of information via the determined correction signal to the central control unit 18 which, for example, uses said items of information for actuating the loudspeaker 22.

Via the switching input 26 of the control apparatus 14, the generation of the correction signal can either be manually switched off and switched on again by the driver of the motor vehicle or else automatically by a driver assistance system coupled to the switching input 26. Alternatively, the switching input 26 for switching the correction signal off and on can also be coupled to the central control unit 18. The correction signal can, for example, be switched off in order to introduce the sound into the passenger compartment 10 and thereby warn the driver of an impending collision with another road user. For this purpose, the sound can even be introduced into the passenger compartment 10 in an amplified state. To this end, the correction signal is generated by the device 12 such that the sound is amplified within the passenger compartment 10.

In addition, the degree of dampening or amplification of the sound introduced into the passenger compartment 10 can be specified by the manufacturer or the driver of the motor vehicle. For this purpose, corresponding modifications to the data of the central control unit 18 are performed. The central control unit 18 provides said data to the control apparatus 14 which controls the generation of the correction signal on the basis of said data.

The device 12 according to the invention can furthermore be combined with further passive measures for acoustic damping. Thus, sound-directing plates can, for example, be disposed on the motor vehicle in order to acoustically separate a region outside of the passenger compartment 10 from a region within the passenger compartment 10.

Figure 3:
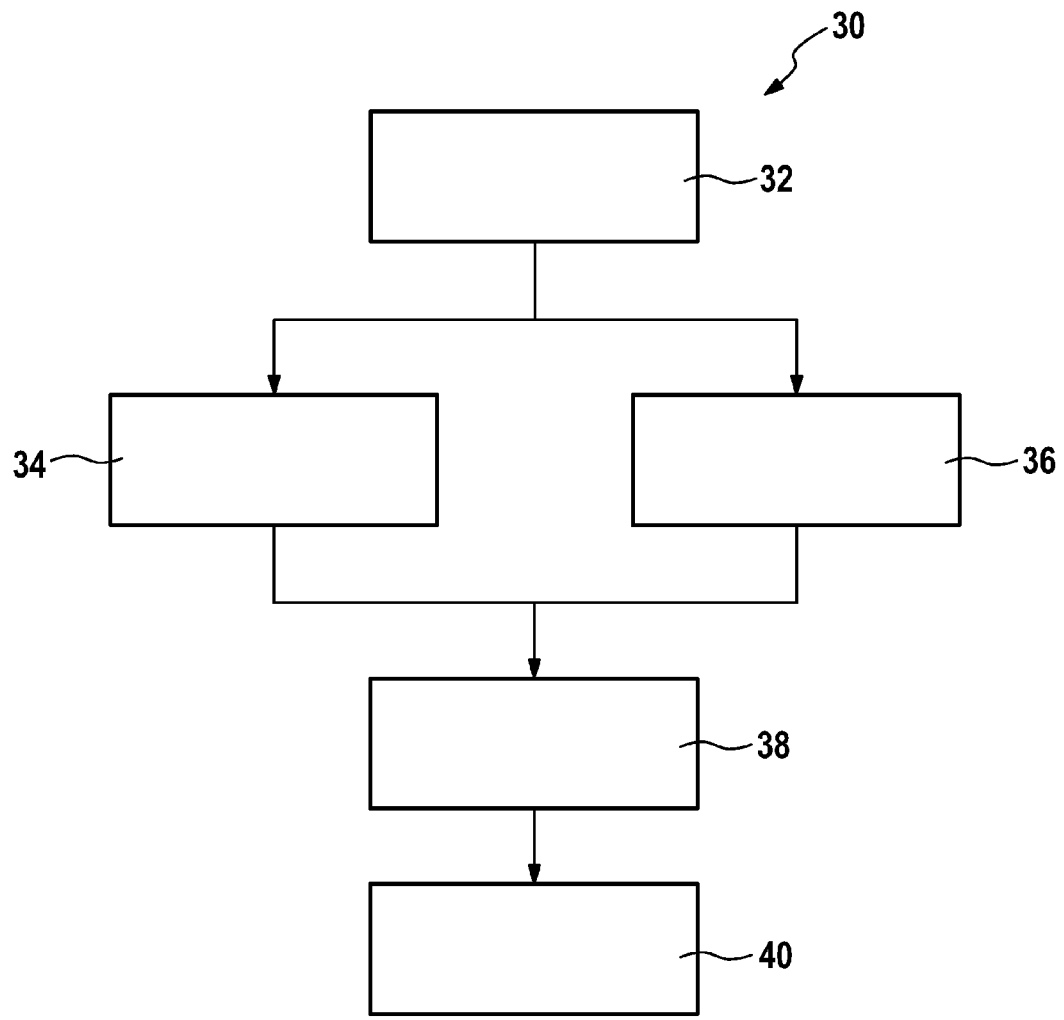
FIG. 3 shows a diagram for explaining an embodiment of a method according to the invention.

FIG. 3 shows a diagram for explaining an embodiment of a method 30 according to the invention.

In step 32, the sound is initially generated by the sound source 22 disposed outside of the passenger compartment 10 in order to warn other road users of the approaching electrically driven motor vehicle.

In a further step, the data are acquired by the control apparatus 14, which are provided by the central control unit 18. The data comprise, for example, items of information about the planned actuation procedure which is used to generate the sound. The data can further comprise a damping or amplifying factor that can be applied to the sound introduced into the passenger compartment 10. In addition, the data can comprise items of information concerning the driving state of the motor vehicle, such as, e.g., the speed of said motor vehicle. As a result, the damping or amplifying of the sound introduced into the passenger compartment 10 can be formed as a function of the speed of the vehicle.

In step 36, the signal caused by the sound is detected by the sound detection means 24 and provided to the control apparatus 14. The sound detection means 24 are disposed to this end preferably in the passenger compartment 14 or at the sound-transmitting structure 20. With the aid of the sound detection means 24, a control circuit for controlling the correction signal is formed.

In a subsequent step 38, the correction signal is determined on the basis of data from the central control unit 18 and from the detected sound signal in combination with correction factors.

As an alternative, only the data of the central control unit 18 can be used for determining the correction signal. Thus, the sound detection means 24 can be omitted in this embodiment.

In a further alternative embodiment, the correction signal is only formed on the basis of the detected sound signal. The data of the central control unit 18 are not taken into account in this alternative embodiment.

In the present exemplary embodiment, the correction signal is determined such that the sound in the passenger compartment 10 is substantially suppressed.

In an alternative embodiment, the correction signal can be determined such that the sound in the passenger compartment 10 is only partially damped or also amplified. It is additionally possible to dynamically adjust the damping or amplification of the sound in the passenger compartment 10 during the driving operation as a function of different driving conditions. As a result, impending hazardous situations or even the speed of the motor vehicle can, for example, influence the damping or amplification of the sound in the passenger compartment 10.

In step 40, the correction signal is finally outputted by the correction signal means 16. In so doing, the generation of the correction signal can be switched off in order to transmit the sound into the passenger compartment 10 and thereby warn the driver of an impending hazardous situation.

With the aid of the method 30 according to the invention, it is possible by means of the sound generated outside of the passenger compartment 10 to make other road users aware of the electrically driven vehicle and at the same time ensure a high degree of driving comfort by the sound introduced into the passenger compartment 10 being substantially suppressed. In addition, the inventive method 30 increases the safety of the motor vehicle by the sound, for example in hazardous situations, being introduced into the passenger compartment only in a weakly damped state or even in an amplified state. Cost advantages furthermore ensue because passive measures for acoustic damping can be spared as a result of the present invention.

Although preferred embodiments of the inventive device and the inventive method have thus been shown, it goes without saying that different variations and modifications can be performed without departing from the scope of the invention.

For example, the inventive method or the inventive device can also be used with conventionally driven vehicles. In this case, the sound introduced into the passenger compartment of the motor vehicle is modified, said sound being generated by any desired sound source disposed outside of the passenger compartment.

The invention claimed is:

1. A method for modifying the amplitude of a sound introduced into a passenger compartment of a motor vehicle, said method comprising:
   actuating, via a central control unit, a sound source arranged outside of the passenger compartment to generate an external sound;
   detecting, via a microphone, the external sound;
   generating an electrical correction signal with the central control unit based on the detected external sound and a factor for adjusting the dampening or amplification of the external sound;
   providing the electrical correction signal to a correction signal means;
   structurally pairing a sound-transmitting structure directly with a sound source and the correction signal means via a sound transmission path, to facilitate the transmission of sound into the passenger compartment of the vehicle via the sound transmission path;
   generating, via the correction signal means, an acoustic correction signal based on the electrical correction signal, wherein the acoustic correction signal is determined such that the external sound is introduced into the passenger compartment via the sound transmission path in either a damped state or an amplified state.

2. The method according to claim 1, wherein the electrical correction signal is determined on the basis of data from the central control unit, said data being used to actuate the sound source.

3. The method according to claim 1, wherein the acoustic correction signal is determined such that the sound is substantially suppressed in the passenger compartment.

4. The method according to claim 1, wherein the acoustic correction signal is switched off in order to transmit the external sound into the passenger compartment.

5. A device for modifying a sound introduced into a passenger compartment of a motor vehicle, the device comprising: a central control unit configured to actuate a sound source arranged outside of the passenger compartment to generate the external sound and to generate an electrical correction signal; structurally pairing a sound-transmitting structure directly with a sound source and a correction signal means via a sound transmission path, wherein the correction signal means is configured to receive the generated electrical correction signal and to generate an acoustic correction signal based on the electrical correction signal such that the external sound is introduced into the passenger compartment via the sound transmission path in a damped state or an amplified state; and a microphone arranged in the passenger compartment or at the sound-transmitting structure, wherein the microphone is configured to detect the external sound, wherein the electrical correction signal is based on the detected external sound and a factor for adjusting the dampening or amplification of the external sound.

6. The device according to claim 5, wherein the device further comprises a control apparatus which is configured to be coupled to the correction signal means and/or the central control unit, the control apparatus configured to receive a switching input for the purpose of switching the electrical correction signal on or off.

7. The device according to claim 5, wherein the correction signal means comprise an actuator for generating mechanical oscillations, a loudspeaker, or both.

8. The device according to claim 5, wherein the sound source is an oscillation generator.

9. The method according to claim 4, wherein the external sound introduced into the passenger compartment provides a warning of an impending hazard to a driver of the vehicle.

10. The device according to claim 5, wherein the acoustic correction signal is switched off in order to transmit the external sound into the passenger compartment.

11. The device according to claim 10, wherein the external sound introduced into the passenger compartment provides a warning of an impending hazard to a driver of the vehicle.

12. The device according to claim 1, wherein the factor is manually adjusted by a driver of the vehicle.

13. The device according to claim 1, wherein the factor is automatically adjusted by a driver assistance system of the vehicle.

14. The device according to claim 4, wherein the electrical correction signal is manually switched off by a driver of the vehicle.

15. The device according to claim 4, wherein the electrical correction signal is automatically switched off by a driver assistance system of the vehicle.

16. The method of claim 2, wherein the data includes at least one selected from the group consisting of a predetermined actuation procedure, a factor for adjusting the dampening or amplification of the external sound introduced into the passenger compartment of the vehicle, and a driving condition.

17. The method of claim 1, wherein generating the electrical correction signal includes generating the electrical correction signal to amplify the external sound within the passenger compartment of the vehicle to warn the driver of the vehicle of a driving condition.

* * * * *